(12) United States Patent
Tomioka

(10) Patent No.: US 8,325,212 B2
(45) Date of Patent: Dec. 4, 2012

(54) LIGHT SCANNING DEVICE AND IMAGE FORMING APPARATUS PROVIDED WITH THE SAME

(75) Inventor: Hiroyuki Tomioka, Osaka (JP)

(73) Assignee: Kyocera Mita Corporation (JP)

( * ) Notice: Subject to any disclaimer, the term of this patent is extended or adjusted under 35 U.S.C. 154(b) by 429 days.

(21) Appl. No.: 12/543,877

(22) Filed: Aug. 19, 2009

(65) Prior Publication Data

US 2010/0046984 A1 Feb. 25, 2010

(30) Foreign Application Priority Data

Aug. 20, 2008 (JP) ................................ 2008-211960

(51) Int. Cl.
*B41J 15/14* (2006.01)
*B41J 27/00* (2006.01)
*B41J 2/435* (2006.01)

(52) U.S. Cl. ........ 347/243; 347/245; 347/259; 347/260; 347/263

(58) Field of Classification Search .................. 347/243, 347/259, 260, 245, 263
See application file for complete search history.

(56) References Cited

U.S. PATENT DOCUMENTS

| | | | |
|---|---|---|---|
| 4,868,673 A * | 9/1989 | Negoro | 358/296 |
| 5,592,337 A * | 1/1997 | Hama | 359/872 |
| 6,750,997 B2 * | 6/2004 | Tamaru et al. | 359/205.1 |
| 7,477,279 B2 * | 1/2009 | Ohnishi | 347/263 |
| 2005/0122704 A1 * | 6/2005 | Yoshikawa et al. | 362/8 |
| 2006/0114538 A1 * | 6/2006 | Morooka | 359/196 |

FOREIGN PATENT DOCUMENTS

| | | | |
|---|---|---|---|
| JP | 10282399 A | * | 10/1998 |
| JP | 11142767 A | * | 5/1999 |
| JP | 2002-267978 | | 9/2002 |
| JP | 2002341121 A | * | 11/2002 |

* cited by examiner

*Primary Examiner* — Laura Martin
*Assistant Examiner* — Jeremy Bishop
(74) *Attorney, Agent, or Firm* — Gerald E. Hespos; Michael J. Porco

(57) ABSTRACT

A light scanning device includes a light source emitting light, a polygon mirror reflecting the light while rotating, a mirror member having a mirror surface reflecting the light, reflected by the polygon mirror, toward an object to be scanned, a vibration preventing member attached to a portion of the mirror member excluding the mirror surface to prevent the mirror member from vibrating, and a housing supporting the polygon mirror and the mirror member. The mirror member extends in a predetermined direction in the housing, and the vibration preventing member is divided into a plurality of pieces that are so attached to the mirror member as to adjoin each other in the predetermined direction.

18 Claims, 6 Drawing Sheets

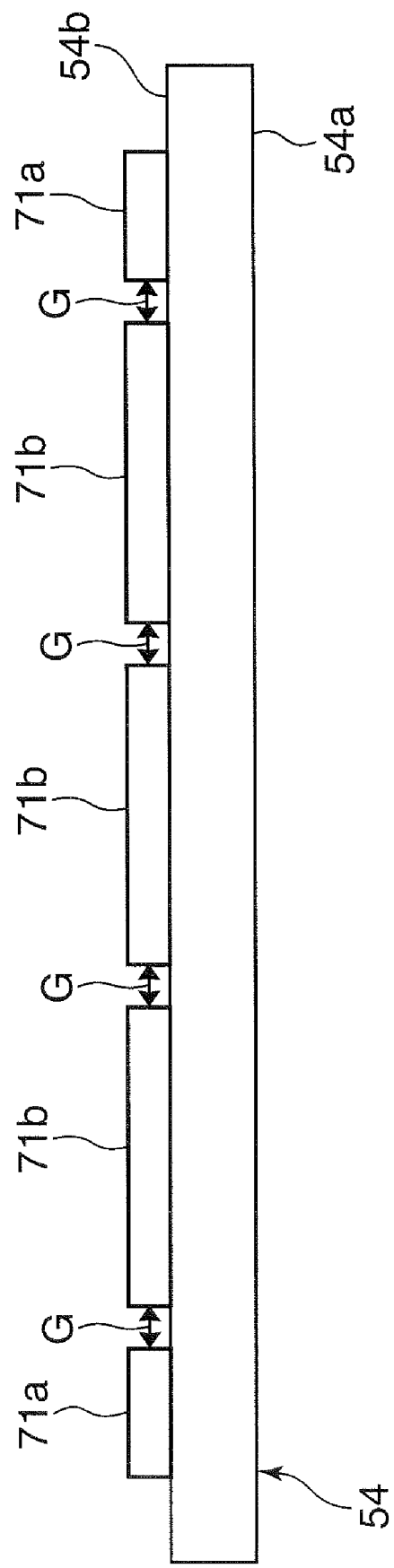

LIGHT SCANNING DEVICE AND IMAGE FORMING APPARATUS PROVIDED WITH THE SAME

BACKGROUND OF THE INVENTION

1. Field of the Invention

The present invention relates to a light scanning device and an image forming apparatus provided with the same.

2. Description of the Background Art

Conventionally, a light scanning device (LSU: laser scanner unit) provided in an image forming apparatus includes a reflecting mirror (mirror member) for reflecting light, emitted from a light source and then reflected by a polygon mirror, toward a photosensitive drum which is an object to be scanned.

The aforementioned reflecting mirror has a rectangular mirror surface which is elongate in a horizontal direction, the reflecting mirror being supported by a housing at both ends of the mirror in a longitudinal direction thereof. For this reason, vibration of the polygon mirror attached also to the housing is transmitted to the reflecting mirror through the housing. If the natural frequency of the reflecting mirror generally matches the frequency of vibration of the polygon mirror produced by rotary motion thereof, causing so-called resonance in which the vibration of the reflecting mirror is amplified resulting in yet greater vibration of the reflecting mirror.

One problem which can occur due to the resonance of the reflecting mirror produced in the aforementioned manner is that the light would not be reflected exactly onto the photosensitive drum, resulting in deterioration in image quality.

Under such circumstances, Japanese Laid-open Patent Publication No. 2002-267978 introduces an arrangement for preventing the aforementioned resonance problem by means of a single piece of a metal member (resonance preventing member) which is attached to a reflecting mirror, covering generally an entire longitudinal range thereof, to vary the weight and natural frequency of the reflecting mirror.

Generally, the reflecting mirror has an extremely flat surface whose flatness is sufficiently higher than that of the resonance preventing member. Therefore, in the arrangement of Japanese Laid-open Patent Publication No. 2002-267978 in which the resonance preventing member is attached to the reflecting mirror to cover generally the entire longitudinal range thereof, the flatness of the reflecting mirror is greatly affected by the flatness of the resonance preventing member and, thus, the reflecting mirror warps along the longitudinal direction due to warpage of the resonance preventing member along the longitudinal direction thereof. This produces a problem that deterioration in image quality occurs due to a reduction in the flatness of the reflecting mirror and resultant nonlinear scanning of light over the photosensitive drum.

SUMMARY OF THE INVENTION

The present invention has been made to provide a solution to the aforementioned problems. Accordingly, it is an object of the invention to provide a laser scanner unit of an image forming apparatus having capability to prevent deterioration in image quality.

To achieve the aforementioned object, a light scanning device according to one aspect of the invention includes a light source emitting light, a polygon mirror reflecting the light while rotating, a mirror member having a mirror surface reflecting the light, reflected by the polygon mirror, toward an object to be scanned, a vibration preventing member attached to a portion of the mirror member excluding the mirror surface to prevent the mirror member from vibrating, and a housing supporting the polygon mirror and the mirror member. The mirror member extends in a predetermined direction in the housing, and the vibration preventing member is divided into a plurality of pieces that are so attached to the mirror member as to adjoin each other in the predetermined direction.

These and other objects, features and advantages of the invention will become more apparent upon a reading of the following detailed description in conjunction with the accompanying drawings.

BRIEF DESCRIPTION OF THE DRAWINGS

FIG. 6 is a side view showing modification of the resonance preventing member.

DETAILED DESCRIPTION OF THE PREFERRED EMBODIMENT

An embodiment of the present invention is now described hereinbelow with reference to the drawings.

Figure 1:
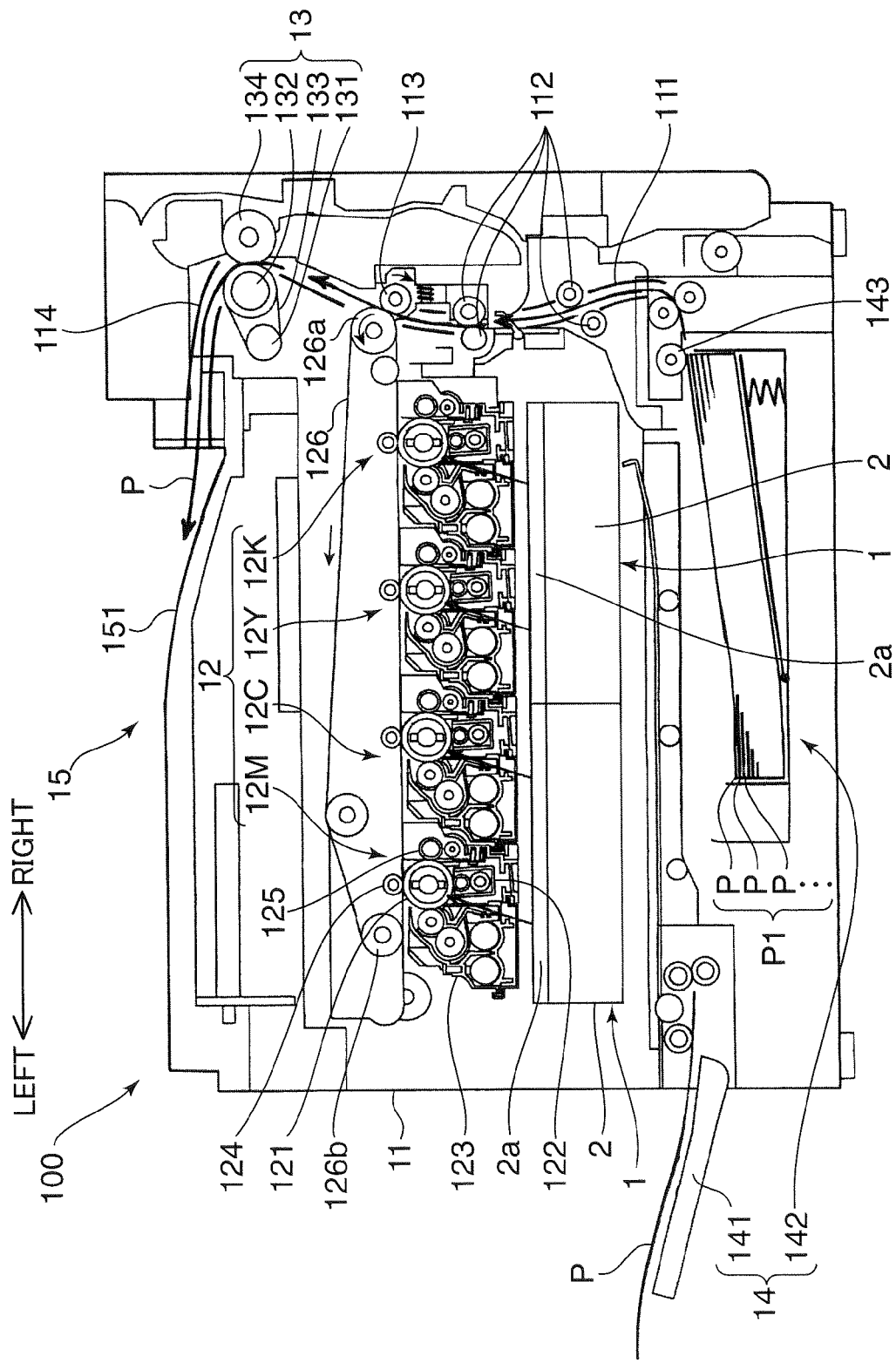
FIG. 1 is a cross-sectional front view showing the overall structure of a printer according to one embodiment of the present invention.
Figure 2:
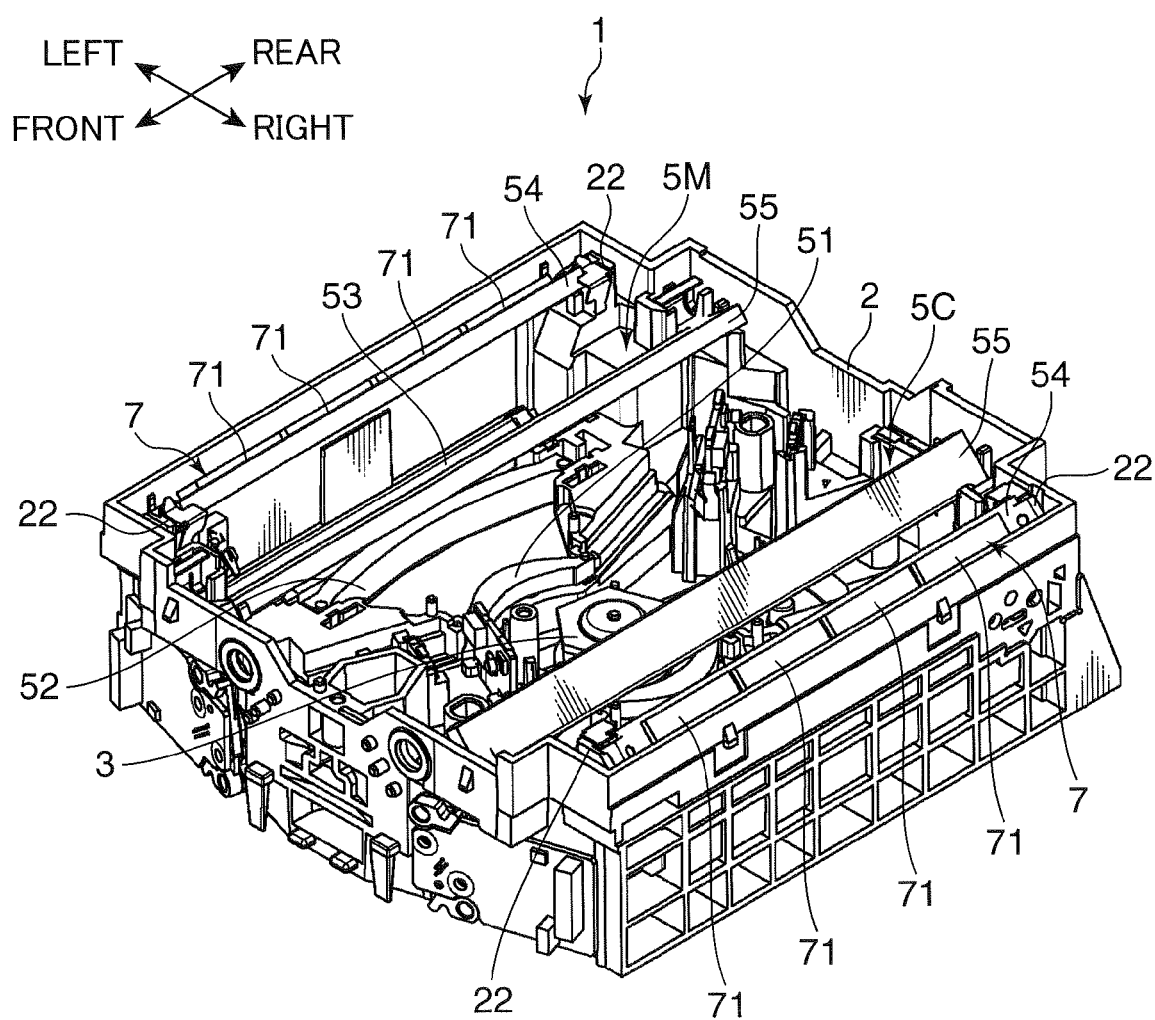
FIG. 2 is a perspective view showing the structure of principal components of a laser scanner unit of the printer shown in FIG. 1.
Figure 3:
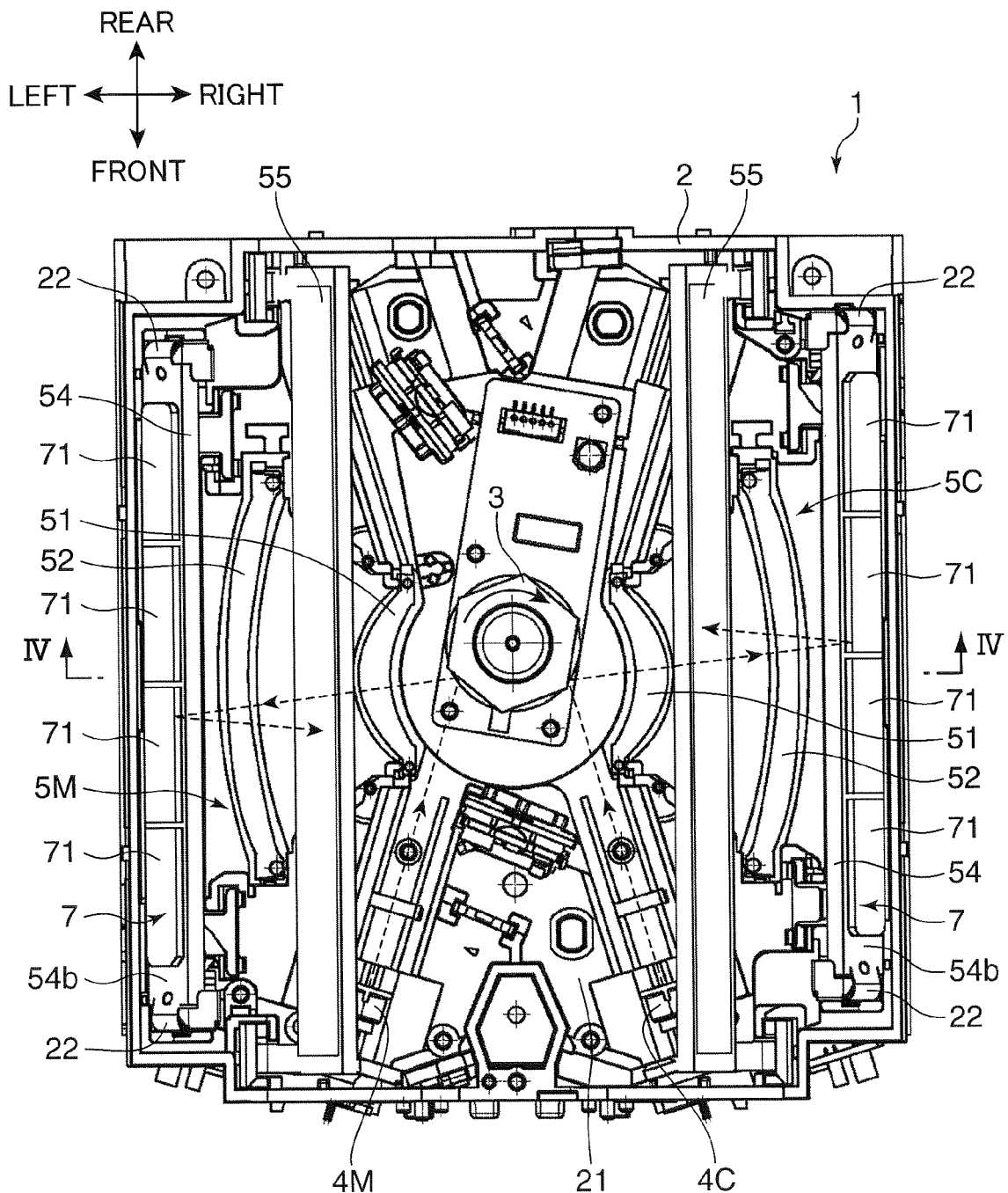
FIG. 3 is a plan view showing of the laser scanner unit shown in FIG. 2.
Figure 4:
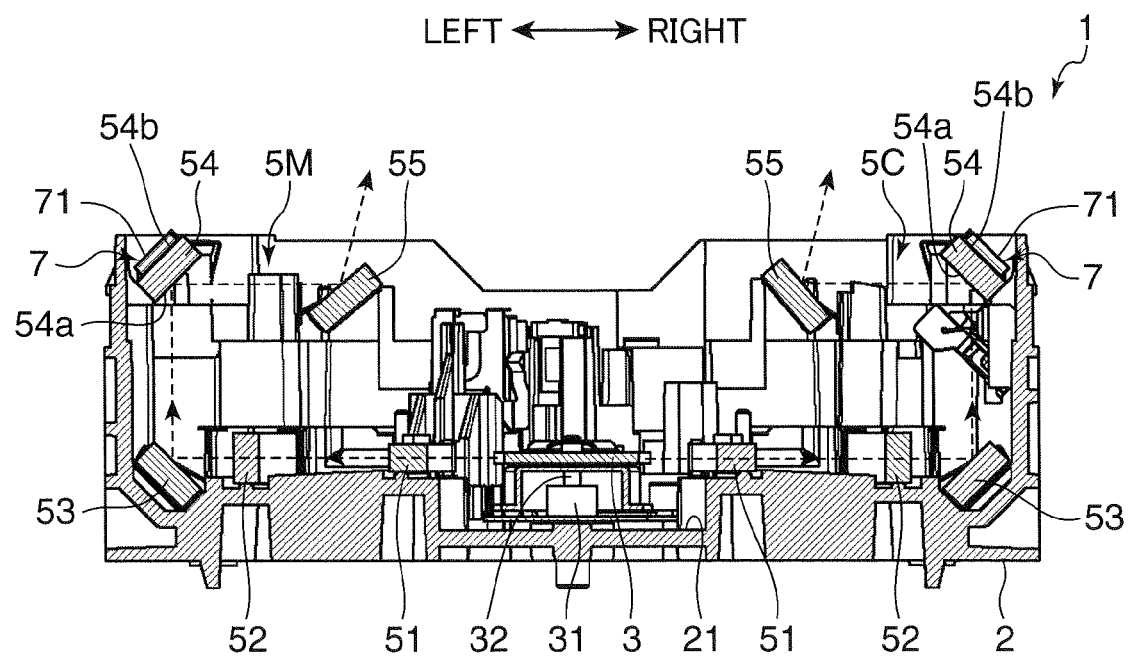
FIG. 4 is a cross-sectional view taken along lines IV-IV of FIG. 3.
Figure 5:
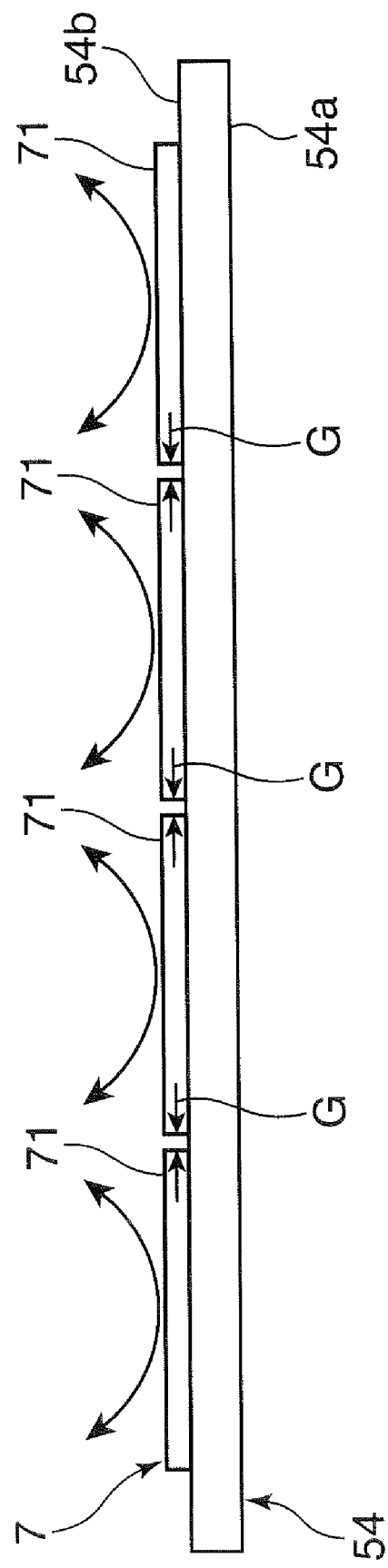
FIG. 5 is a diagram for explaining the influence of warpage of individual divided pieces of a resonance preventing member on flatness of a reflecting mirror.

FIG. 1 is a cross-sectional front view showing the overall structure of a printer according to one embodiment of the present invention, and FIGS. 2 to 4 are diagrams showing the structure of principal components of a light scanning device of the printer shown in FIG. 1. Referring to FIG. 1, the overall structure of the printer 100 according to the embodiment of the invention is first described.

The printer 100 of this embodiment is configured to include, in an apparatus main body 11, an image forming section 12 for forming an image and transferring the image to a sheet of paper P, a fixing unit 13 for performing a fixing process on the image transferred to the sheet P and a sheet storage section 14 holding a stack of sheets (papers) P used for image forming operation. The printer 100 also includes a sheet output portion 15 provided at an upper part of the apparatus main body 11 to which each sheet P is output upon completion of the fixing process as shown in FIG. 1.

The image forming section 12 is for forming a toner image on the sheet P fed from the sheet storage section 14. In this embodiment, the image forming section 12 includes a magenta image forming unit 12M, a cyan image forming unit 12C, a yellow image forming unit 12Y and a black image forming unit 12K which are arranged in this order from an upstream side (left side as shown in FIG. 1) to a downstream side (right side as shown in FIG. 1).

Each of these units 12M, 12C, 12Y, 12K has a photosensitive drum 121, a charging unit 122, a developing unit 123, a primary transfer roller 124 and a cleaning unit 125 which are arranged in this order clockwise along a peripheral surface of the photosensitive drum 121 from a position immediately therebelow as illustrated in FIG. 1. Further below the charging unit 122, there are provided light scanning devices (LSU:

laser scanner units) 1. In this embodiment, there are two laser scanner units 1 disposed adjacent to each other on left and right sides. The left-hand laser scanner unit 1 corresponds to the magenta image forming unit 12M and the cyan image forming unit 12C while the right-hand laser scanner unit 1 corresponds to the yellow image forming unit 12Y and the black image forming unit 12K.

The peripheral surface of the photosensitive drum 121 has a layer of amorphous silicon which is suited for forming both an electrostatic latent image and a toner image.

The charging unit 122 is for imparting a uniform electric charge to the peripheral surface of the photosensitive drum 121 by a corona discharge.

Each of the laser scanner units 1 projects laser light to the peripheral surface of the photosensitive drum 121, which is rotating, to erase the electric charge on the peripheral surface thereof according to a specific pattern to thereby create an electrostatic latent image on the surface of the photosensitive drum 121. Each laser scanner unit 1 is configured to include a box-like housing 2 having a top opening and a cover element 2a covering the top opening of the housing 2, the cover element 2a having openings formed at appropriate locations for allowing the laser light to pass through. The laser scanner units 1 will be described later in detail.

The developing unit 123 is for forming the toner image on the peripheral surface of the photosensitive drum 121 by supplying toner to areas of the circumferential photosensitive drum 121 where the electrostatic latent image is formed.

Provided at a location above the photosensitive drum 121 is a transfer belt 126 which is mounted between a driving roller 126a and a driven roller 126b and held in contact with the photosensitive drum 121. The transfer belt 126 is configured to turn in synchronism with the photosensitive drum 121 under conditions where the transfer belt 126 is pressed against the peripheral surface of the photosensitive drum 121 by the aforementioned primary transfer roller 124.

Therefore, as the transfer belt 126 turns, the magenta image forming unit 12M, the cyan image forming unit 12C, the yellow image forming unit 12Y and the black image forming unit 12K transfer the toner images in different colors to the transfer belt 126 one on top of another at the same locations on a surface of the transfer belt 126, whereby a color toner image is formed on the surface of the transfer belt 126. The color toner image thus formed on the surface of the transfer belt 126 is transferred to the sheet P in a later stage.

The cleaning unit 125 is for cleaning the peripheral surface of the photosensitive drum 121 by removing residual toner therefrom after the aforementioned image transfer process. The peripheral surface of the photosensitive drum 121 cleaned by the cleaning unit 125 advances again toward the charging unit 122 in preparation of a succeeding image forming task.

Located to the right of the image forming section 12 is a vertically extending sheet transport path 111 which is associated with transport roller pairs 112 provided at appropriate locations. Each sheet P fed from the sheet storage section 14 is transported by these transport roller pairs 112 toward the transfer belt 126.

The sheet transport path 111 is also associated with a secondary transfer roller 113 which is located at a position facing the driving roller 126a and kept in contact with the surface of the transfer belt 126. As the sheet P being transported along the sheet transport path 111 is nipped between the transfer belt 126 and the secondary transfer roller 113 under pressure, the toner image on the surface of the transfer belt 126 is transferred to the sheet P. In this embodiment, the transfer belt 126, the primary transfer roller 124 and the secondary transfer roller 113 together constitute an image transfer section.

The fixing unit 13 includes a heating roller 131 having a built-in electric heating element, a fixing roller 132 provided to the right of the heating roller 131, a fixing belt 133 mounted between the heating roller 131 and the fixing roller 132, and a pressing roller 134 disposed face to face with the fixing roller 132 with the fixing belt 133 passing in between.

The sheet P fed into the fixing unit 13 carrying the toner image transferred thereto when passing through a nip formed between the transfer belt 126 and the secondary transfer roller 113 is subjected to the fixing process in which the sheet P receives heat from the fixing belt 133 while passing between the pressing roller 134 and the fixing belt 133.

The sheet P which has undergone the fixing process is ejected onto an output tray 151 of the sheet output portion 15 through a sheet output path 114 extending from an upper part of the fixing unit 13.

The sheet storage section 14 includes a manual feed tray 141 which is mounted swingably on a side wall of the apparatus main body 11 and a sheet tray 142 mounted beneath the laser scanner units 1 within the apparatus main body 11 in a manner that the sheet tray 142 can easily be removed from and reinserted into the apparatus main body 11.

The manual feed tray 141 is provided to enable a user to feed one sheet P after another by manual operation.

The sheet tray 142 is configured to provide capability to hold a stack P1 of plural sheets P. A pickup roller 143 when activated picks up an uppermost one of the sheets P in the sheet tray 142 and feeds that sheet P into the sheet transport path 111. The sheet P fed into the sheet transport path 111 is transported through the sheet transport path 111 and fed into the image forming section 12 by the transport roller pairs 112.

The structure of principal components of the left-hand laser scanner unit 1 shown in FIG. 1 is now described with reference to FIGS. 1 to 4. The right-hand laser scanner unit 1 has generally the same structure as the left-hand laser scanner unit 1. Accordingly, the following discussion does not include a detailed description of the right-hand laser scanner unit 1.

As shown in FIGS. 2 to 4, the laser scanner unit 1 includes a polygon mirror 3, a light emitting diode (LED) 4M and an optical system 5M corresponding to the magenta image forming unit 12M (see FIG. 1) as well as an LED 4C and an optical system 5C corresponding to the cyan image forming unit 12C (see FIG. 1).

The polygon mirror 3 is located at a central part of the housing 2 and is connected to a drive shaft 32 of a polygon motor 31 which is attached to an internal bottom surface 21 of the housing 2. The polygon mirror 3 is configured to reflect laser light emitted from the LEDs 4M, 4C while rotating clockwise as illustrated in FIG. 3.

The LED 4M is mounted at a position slightly leftward in front of the polygon mirror 3 facing thereto. On the other hand, the LED 4C is mounted at a position slightly rightward in front of the polygon mirror 3 facing thereto.

The optical system 5M for guiding the laser light emitted from the LED 4M and then reflected by the polygon mirror 3 to the peripheral surface of the photosensitive drum 121 of the corresponding magenta image forming unit 12M is located at a position to the left of the polygon mirror 3. Also, the optical system 5C for guiding the laser light emitted from the LED 4c and then reflected by the polygon mirror 3 to the peripheral surface of the photosensitive drum 121 of the corresponding cyan image forming unit 12C is located at a position to the right of the polygon mirror 3.

The optical systems 5M, 5C are each configured with two fθ lenses 51, 52 and three reflecting mirrors 53, 54, 55, wherein the reflecting mirror 54 corresponds to the "mirror member" according to the present invention and has a mirror surface 54a that reflects the light, reflected by the polygon mirror 3, towards the photosensitive drum 121.

The two fθ lenses 51, 52 of the optical system 5M are provided side by side to the left of the polygon mirror 3.

The reflecting mirror 53 of the optical system 5M is arranged in the housing 2 at a left end of a lower part thereof. The reflecting mirror 53 has a rectangular mirror surface which is elongate along a front-rear direction and disposed in a posture oriented rightwardly and obliquely upward.

The reflecting mirror 54 of the optical system 5M is arranged at a position above the reflecting mirror 53 in the housing 2 at an upper part of a left end thereof. The reflecting mirror 54 has a rectangular mirror surface 54a which is elongate along the front-rear direction and disposed in a posture oriented rightwardly and obliquely downward. The reflecting mirror 54 is supported at both ends in a longitudinal direction thereof by mirror supports 22 provided in the housing 2 at a front left end and a rear left end thereof.

The reflecting mirror 55 of the optical system 5M is arranged at a position in the housing 2 closer to the central part thereof than the reflecting mirror 54. The reflecting mirror 55 has a rectangular mirror surface which is elongate along the front-rear direction and disposed in a posture oriented leftwardly and obliquely upward.

The individual constituent elements 51-55 of the optical system 5C are not described in detail, because these elements are in left-right symmetry with the above-described constituent elements 51-55 of the optical system 5M.

After the laser light emitted from the LEDs 4M, 4C and reflected by the polygon mirror 3 has passed through the two fθ lenses 51, 52 of the optical systems 5M, 5C, the laser light is successively reflected by the three reflecting mirrors 53, 54, 55 of the respective optical systems 5M, 5C and guided to the peripheral surfaces of the photosensitive drums 121 of the units 12M, 12C, as shown by broken lines in FIGS. 3 and 4. Consequently, electrostatic latent images are written in the photosensitive drums 121 of the units 12M, 12C.

Each of the reflecting mirrors 54 of the optical systems 5M, 5C has a rear surface 54b opposite the mirror surface 54a. The rear surface 54b has a resonance preventing member 7 attached thereto by adhesive bonding generally all along the rear surface 54b in the longitudinal direction thereof. Each of the resonance preventing members 7 is a vibration preventing member which serves to prevent the reflecting mirror 54 from vibrating. Vibration produced by rotary motion of the polygon mirror 3 is transmitted to the reflecting mirrors 54 through the housing 2. If the natural frequency of the reflecting mirrors 54 generally matches the frequency of vibration produced by the rotary motion of the polygon mirror 3, the vibration of the reflecting mirrors 54 is amplified, thus producing greater vibration (resonance) thereof. If such resonance occurs, the laser light reflected by the reflecting mirrors 54 would not correctly be radiated upon the respective photosensitive drums 121, resulting in deterioration in image quality.

Under such circumstances, the resonance preventing members 7 are attached to the reflecting mirrors 54 to vary the natural frequency of the reflecting mirrors 54 so that the natural frequency of the reflecting mirrors 54 does not coincide with the frequency of vibration of the polygon mirror 3 as mentioned above to thereby prevent resonance of the reflecting mirrors 54.

The reflecting mirrors 54 have a sufficiently high degree of flatness compared to the resonance preventing members 7. This means that the mirror surfaces 54a of the reflecting mirrors 54 are made extremely flat compared to surfaces of the resonance preventing members 7. Accordingly, when the resonance preventing members 7 are attached to the reflecting mirrors 54, the flatness of the reflecting mirrors 54 is affected by the flatness of the resonance preventing members 7, or affected by warpage of the resonance preventing members 7.

Therefore, if a single piece of a resonance preventing member is attached to a reflecting mirror as in the aforementioned conventional arrangement, the reflecting mirror would warp in accordance with warpage of the resonance preventing member, adversely affecting the shape of the reflecting mirror and significantly impairing the flatness thereof.

To avoid this problem, each resonance preventing member 7 is divided into plural pieces (four pieces in this embodiment) along a longitudinal direction thereof as illustrated in FIGS. 2 and 3. More specifically, each of the resonance preventing members 7 does not encompass an entire length of the reflecting mirror 54 continuously along the longitudinal direction thereof but leaves end portions of the reflecting mirror 54 uncovered as illustrated. The individual divided pieces of each resonance preventing member 7 are hereinafter referred to as the divided pieces 71.

The aforementioned individual divided pieces 71 are generally rectangular thin metal plates of the same size that are so attached to the rear surface 54b of each reflecting mirror 54 as to adjoin each other in the longitudinal direction of the reflecting mirror 54. Gaps G are formed between the adjacent divided pieces 71. These divided pieces 71 can easily be formed by cutting a conventionally used resonance preventing member into an equal length, for example. This arrangement makes it possible that the resonance preventing member 7 can be produced at low cost without any need to vary an optical layout of the laser scanner unit 1.

According to the above-described configuration, even if each of the divided pieces 71 of the resonance preventing member 7 attached to the reflecting mirror 54 is warped, the warpage of each divided piece 71 affects the reflecting mirror 54 only locally, so that the flatness of the reflecting mirror 54 is not so affected by the flatness of the resonance preventing member 7 as a whole. This makes it possible to prevent a decrease in the flatness of the reflecting mirror 54 caused by the warpage of the divided pieces 71 of the resonance preventing member 7.

It is to be noted that the larger the number of pieces 71 into which the resonance preventing member 7 is divided (or the smaller the size of each divided piece 71 along the front-rear direction), the smaller the influence of the flatness of the individual divided pieces 71 on the flatness of the reflecting mirror 54. Therefore, it is desirable to properly determine the number of pieces 71 into which the resonance preventing member 7 is divided, taking into consideration an increase in difficulty in mounting the divided pieces 71 on the reflecting mirrors 54 caused by a reduction in size of the individual divided pieces 71.

Since the resonance preventing members 7 divided into a plurality of pieces 71 along the longitudinal direction are attached to the corresponding reflecting mirrors 54 in this embodiment, the flatness of the reflecting mirrors 54 is unlikely to be affected by the flatness of the resonance preventing members 7 compared to the conventional arrangement in which a single piece of a resonance preventing member is attached to a reflecting mirror, covering generally an entire longitudinal range thereof. As it is possible to prevent the reflecting mirrors 54 from warping along the longitudinal direction even when the resonance preventing members 7 are attached, the aforementioned arrangement of the invention serves to avoid deterioration in image quality due to a reduction in the flatness of the mirror surfaces 54a of the reflecting mirrors 54.

Also, as it is possible to configure each resonance preventing member 7 with a plurality of divided pieces 71 having the equal size, the resonance preventing members 7 can be produced at low cost.

Also, as the resonance preventing members 7 are made of metallic material, the resonance preventing members 7 can have a sufficient weight even if the resonance preventing members 7 are thin plates. Therefore, the flatness of the reflecting mirrors 54 is less affected by the flatness of the resonance preventing members 7, making it possible to prevent warpage of the reflecting mirrors 54.

While the foregoing discussion of the embodiment has presented an example in which the invention is applied to the printer 100 which is a typical example of an image forming apparatus of the present invention, the invention is not limited to the printer 100 but is also applicable to such image forming apparatuses as a copying machine and a facsimile machine.

Furthermore, each of the resonance preventing members 7 is divided into four separate pieces 71 attached to the reflecting mirror 54 in the foregoing embodiment, the invention is not limited to this arrangement. For example, each of the resonance preventing members 7 attached to the reflecting mirror 54 may be divided into two or three equal pieces, or five or more equal pieces as appropriate. Additionally, the divided pieces 71 of each resonance preventing member 7 are not limited to a rectangular shape but may have a disclike shape, for example.

Moreover, the individual divided pieces 71 of the resonance preventing members 7 may be of different sizes. For example, the divided pieces 71 may include divided pieces 71a attached to corresponding longitudinal ends of the reflecting mirror 54 and divided pieces 71b attached to an intermediate portion of the reflecting mirror 54, with the divided pieces 71a having a shorter length than the divided pieces 71b as shown in FIG. 6. In this structure, the divided pieces 71a having a shorter length are attached to the longitudinal ends of the reflecting mirror 54 where the reflecting mirror 54 is most likely to be affected by warpage, so that the influence of the warpage can be minimized.

Moreover, the divided pieces 71 of each resonance preventing member 7 need not necessarily be made of metallic material but may be made of other material such as resin material.

While the preferred embodiments of the invention have thus far been described with reference to the drawings, the light scanning device preferably has the following features.

In one preferable form, the light scanning device includes a light source emitting light, a polygon mirror reflecting the light while rotating, a mirror member having a mirror surface reflecting the light, reflected by the polygon mirror, toward an object to be scanned, a vibration preventing member attached to a portion of the mirror member excluding the mirror surface to prevent the mirror member from vibrating, and a housing supporting the polygon mirror and the mirror member. The mirror member extends in a predetermined direction in the housing, and the vibration preventing member is divided into a plurality of pieces that are so attached to the mirror member as to adjoin each other in the predetermined direction.

According to the light scanning device thus structured, the vibration preventing member divided into a plurality of pieces are attached to the mirror member, so that flatness of the mirror member is unlikely to be affected by flatness of the vibration preventing member compared to the conventional arrangement in which a single piece of a resonance preventing member is attached to a reflecting mirror, covering generally an entire longitudinal range thereof. As it is possible to prevent the mirror member from warping along the longitudinal direction when the vibration preventing member is attached, the aforementioned arrangement of the invention serves to avoid deterioration in image quality due to a reduction in the flatness of the mirror surface of the mirror member.

In the above light scanning device, the divided pieces preferably have an equal length in the predetermined direction from each other.

As it is possible to configure the vibration preventing member with a plurality of divided pieces having the equal size, the vibration preventing member can be produced at low cost.

In the above light scanning device, the vibration preventing member is preferably made of a metal plate.

According to this structure, since the vibration preventing member is made of metallic material, the vibration preventing member can have a sufficient weight even if the vibration preventing member is a thin piece. Therefore, the flatness of the mirror member is less affected by the flatness of the vibration preventing member. This makes it possible to prevent warpage of the vibration preventing member.

In the above light scanning device, the divided pieces may have different lengths in the predetermined direction from each other. Also, in a case where the mirror member has a longitudinal size extending in the predetermined direction, of the divided pieces, the divided pieces attached to corresponding longitudinal ends of the mirror member preferably have a shorter length than the divided pieces attached to an intermediate portion of the mirror member.

According to this structure, the divided pieces of the vibration preventing member having a shorter length are attached to the longitudinal ends of the mirror member where the mirror member is most likely to be affected by warpage, so that the influence of the warpage can be minimized.

In still another aspect of the invention, the divided pieces adjoin each other with a gap formed between the adjacent divided pieces.

This application is based on Japanese patent application serial No. 2008-211960, filed in Japan Patent Office on Aug. 20, 2008, the content of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A light scanning device comprising:
   a light source emitting light;
   a polygon mirror reflecting the light while rotating;
   a mirror member having a mirror surface reflecting the light, reflected by the polygon mirror, toward an object to be scanned, the mirror member further having a rear surface opposite the mirror surface;
   a vibration preventing member attached to the rear surface of the mirror member by adhesive bonding to vary a natural frequency of the mirror member;
   a housing accommodating the polygon mirror and the mirror member; and
   a supporting member for supporting the mirror member in the housing;

wherein:
the mirror member has a rectangular shape that is elongated along a predetermined direction in the housing, and
the vibration preventing member is a rectangular flat plate that has a width in a direction perpendicular to the predetermined direction that is shorter than that of the mirror member, and the vibration preventing member is divided into a plurality of pieces to form divided pieces that are attached to the mirror member to adjoin each other in the predetermined direction.

2. The light scanning device according to claim 1, wherein the divided pieces have equal lengths in the predetermined direction.

3. The light scanning device according to claim 1, wherein the vibration preventing member is made of a metal plate.

4. The light scanning device according to claim 1, wherein each of the divided pieces has a length in the predetermined direction, the divided pieces comprising at least one short divided piece and at least one long divided piece, the length of the long divided piece exceeding the length of the short divided piece.

5. The light scanning device according to claim 4, wherein:
the mirror member has a longitudinal size extending in the predetermined direction, and
the at least one short divided piece comprises two short divided pieces attached respectively to corresponding longitudinal ends of the mirror member, the at least one long divided piece being attached to an intermediate portion of the mirror member.

6. The light scanning device according to claim 1, wherein the divided pieces adjoin each other with a gap formed between adjacent divided pieces.

7. An image forming apparatus comprising:
a photosensitive drum;
a light scanning device scanning light over the photosensitive drum to form an electrostatic latent image on the photosensitive drum;
a developing unit supplying toner to the electrostatic latent image to form a toner image;
an image transfer section transferring the toner image onto a sheet; and
a fixing unit fixing the toner image to the sheet;
the light scanning device including:
a light source emitting light;
a polygon mirror reflecting the light while rotating;
a mirror member having a mirror surface reflecting the light, reflected by the polygon mirror, toward the photosensitive drum, the mirror member further having a rear surface opposite the mirror surface;
a vibration preventing member attached to the rear surface of the mirror member by adhesive bonding to vary a natural frequency of the mirror member;
a housing accommodating the polygon mirror and the mirror member; and
a supporting member for supporting the mirror member in the housing;
wherein:
the mirror member has a rectangular shape that is elongated along a predetermined direction in the housing, and
the vibration preventing member is a rectangular flat plate that has a width in a direction perpendicular to the predetermined direction that is shorter than that of the mirror member, and the vibration preventing member of is divided into a plurality of pieces to form divided pieces that are attached to the mirror member to adjoin each other in the predetermined direction.

8. The image forming apparatus according to claim 7, wherein the divided pieces have equal lengths in the predetermined direction.

9. The image forming apparatus according to claim 7, wherein the vibration preventing member is made of a metal plate.

10. The image forming apparatus according to claim 7, wherein each of the divided pieces has a length in the predetermined direction, the divided pieces comprising at least one short divided piece and at least one long divided piece, the length of the long divided piece exceeding the length of the short divided piece.

11. The image forming apparatus according to claim 10, wherein:
the mirror member has a longitudinal size extending in the predetermined direction, and
the at least one short divided piece comprises two short divided pieces attached respectively to corresponding longitudinal ends of the mirror member; the at least one long divided piece being attached to an intermediate portion of the mirror member.

12. The image forming apparatus according to claim 7, wherein the divided pieces adjoin each other with a gap formed between the adjacent divided pieces.

13. The image forming apparatus according to claim 7, wherein the mirror member and the divided pieces are flat.

14. The image forming apparatus according to claim 7, wherein the rear surface of the mirror member and the divided pieces are in surface contact with one another.

15. The light scanning device according to claim 1, wherein the mirror member and the divided pieces are flat.

16. The light scanning device according to claim 1, wherein the rear surface of the mirror member and the divided pieces are in surface contact with one another.

17. A light scanning device comprising:
a light source emitting light;
a polygon mirror reflecting the light while rotating;
a rectangular mirror member having a width and a length greater than the width, the mirror member having a mirror surface reflecting the light reflected from the polygon mirror toward an object to be scanned, the mirror member further having a rear surface opposite the mirror surface;
a housing accommodating the polygon mirror and the mirror member;
a support for supporting the mirror member in the housing; and
a vibration preventing assembly comprising a plurality of rectangular flat plates, each of the plates having opposite ends defining a length and opposite sides defining a width that is less than the width of the mirror member, the flat plates being attached by adhesive bonding to the rear surface of the mirror member in end to end relationship with the lengths of the flat plates being aligned with the length of the mirror member, wherein the vibration preventing assembly varies a natural frequency of the mirror member and wherein warpage of any one of the flat plates has only a local effect on the mirror member.

18. The light scanning device of claim 17, wherein at least one gap exists between at least one of the ends of each of the flat plates and the end of at least one of the flat plates adjacent thereto.

* * * * *